UNITED STATES PATENT OFFICE.

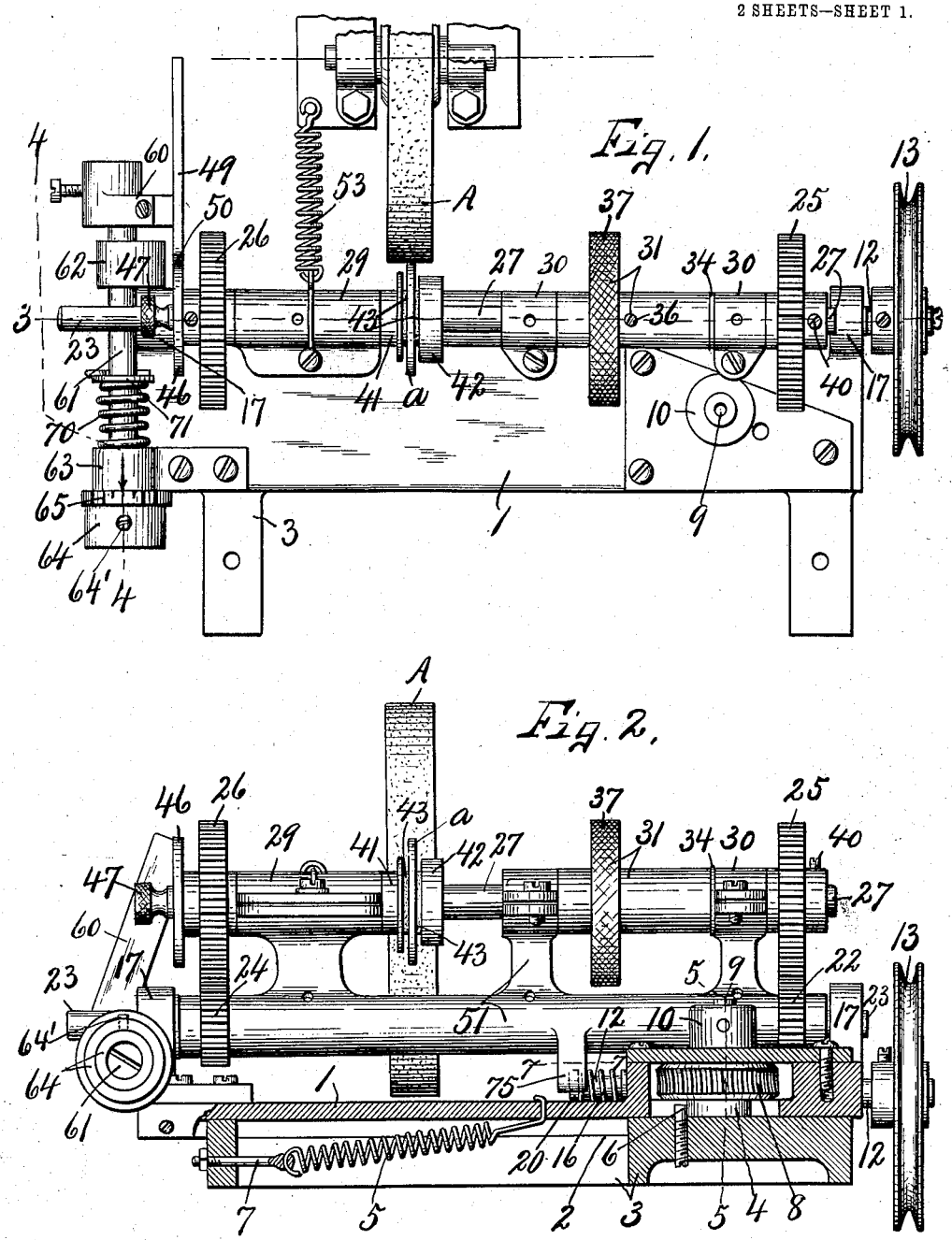

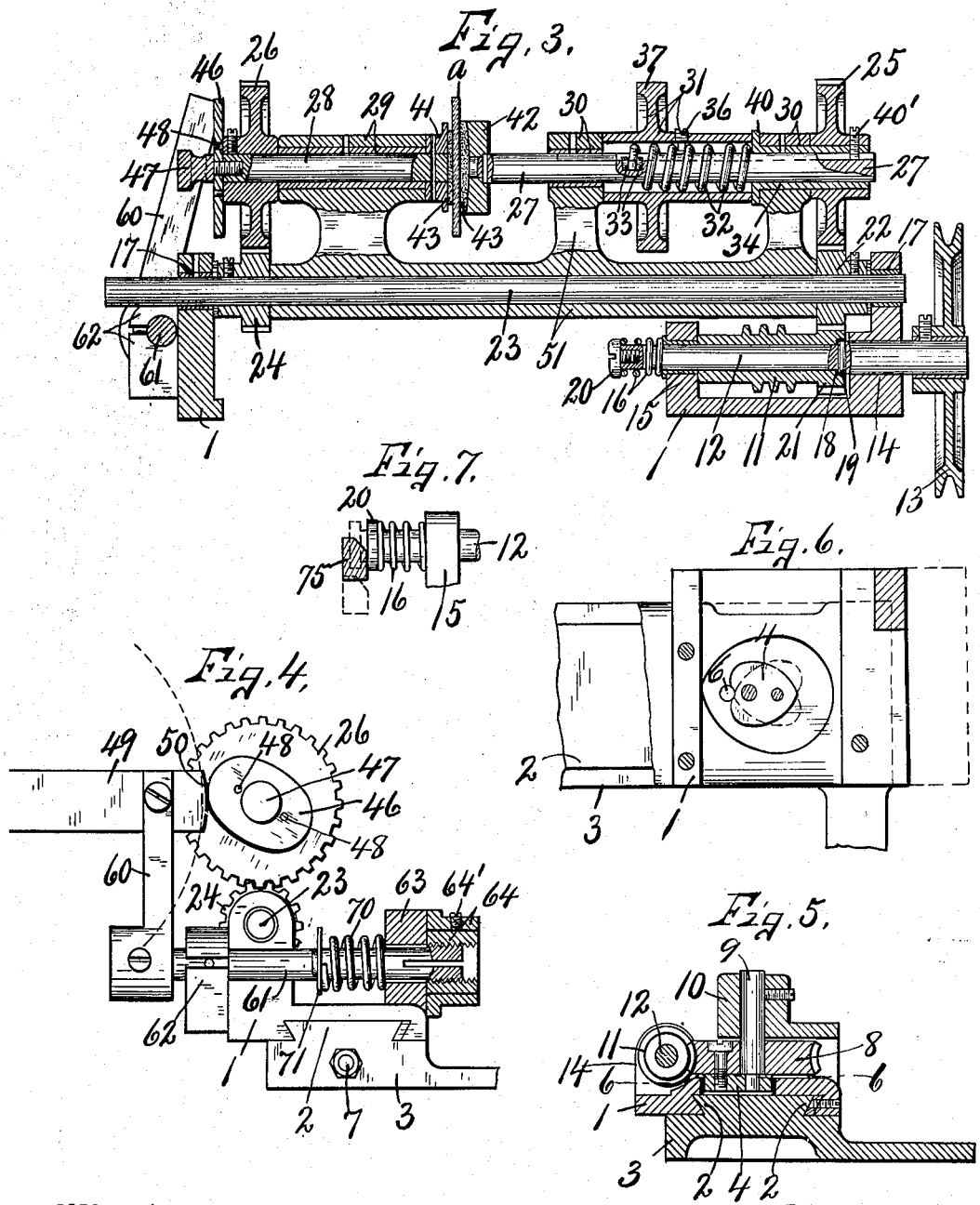

BENNETT F. CLARK, OF GENEVA, NEW YORK, ASSIGNOR TO THE STANDARD OPTICAL COMPANY, OF GENEVA, NEW YORK, A CORPORATION OF NEW YORK.

LENS-GRINDING MACHINE.

No. 900,664.   Specification of Letters Patent.   Patented Oct. 6, 1908.

Application filed April 9, 1907. Serial No. 367,219.

*To all whom it may concern:*

Be it known that I, BENNETT F. CLARK, of Geneva, in the county of Ontario, in the State of New York, have invented new and useful Improvements in Lens-Grinding Machines, of which the following, taken in connection with the accompanying drawings, is a full, clear, and exact description.

This invention relates to certain improvements in lens grinding machines and refers more particularly to the mechanism associated with a rotary grinding element for grinding the edges of lenses to conform to a definite pattern or form. In this class of machines the lens to be ground is clamped between two rotary elements and moved axially in contact with the surface of a rotary grinding element by which it is ground into conformity with a suitable form or pattern revolving on the same axis in contact with a stop or abutment. The mechanism therefore, involves a rotary lens holder; means to move it axially; additional means for bringing the lens to a predetermined form, and further means for adjusting the contact plate or abutment to compensate for the wear of the grinding element.

The essential purpose of my present invention is to simplify and reduce the cost of manufacture of the machine, at the same time to increase its efficiency and bring the several parts into closer relation, making the complete machine more compact and less susceptible to being thrown out of adjustment or alinement. In other words, I have sought to increase the durability and permanency of alinement of the lens holding elements and co-acting parts, so that the machine as a whole will effect the grinding of the lenses into exact conformity with the pattern or masterform, at the same time providing for the grinding of a reasonably wide range of different forms of lenses.

One of the most important specific features of the invention is the means by which the lens is clamped and yieldingly held in place in which a single coil spring coacting with a suitable nut serves the double purpose of a thread for adjusting one of the lens clamps and yieldingly holding it in contact with the lens.

Another specific object is to provide a simple means, consisting in this instance, of a heart cam coacting with suitable shoulders upon a sliding frame to reciprocate said frame under a uniform speed at all points in its travel thereby wearing the surface of the grinding element uniformly.

A further object is to adjust the contact plate for the pattern or lens form in an exact radial line between the axes of the revolving lens and grinding element.

A still further object is to provide a simple graduated adjusting means for the contact plate to determine the size of the lens which is to be ground to the form of the pattern.

Other objects and uses will be brought out in the following description.

In the drawings—Figures 1 and 2 are respectively top plan and a front elevation of a lens grinding machine embodying the various features of my invention, the base of the machine shown in Fig. 2 being partly in section to show the reciprocating means for the sliding carriage. Figs. 3, 4 and 5 are longitudinal sectional views taken respectively on lines 3—3 and 4—4, Fig. 1, and 5—5, Fig. 2. Fig. 6 is a horizontal sectional view taken respectively on line —6—, Fig. 5, and Fig. 7 is a sectional view taken on line 7—7, Fig. 2.

This device is adapted to be associated with a rotary grinding element as a grindstone —A— and comprises essentially a sliding carriage —1— moving parallel with the axis of the grind-stone and carrying a rotary lens holder and a lens form or pattern, both revolving on the same axis and adapted to be adjusted radially to bring the edge of the lens into contact with the periphery of the stone, the periphery of the pattern revolving in contact with a stop or abutment which is adjustable in a radial line drawn between the axes of the lens holders and grind-stone.

The sliding carriage —1— is reciprocated along suitable guides —2— on a fixed bed —3— by means, as a rotary heart cam —4— and a retracting spring —5—, the cam —4— being mounted on the carriage and having its heart-shape perimeter rotating in contact with a fixed abutment as a pin —6— on the bed —3— while the spring —5— is attached at one end to the sliding carriage and its opposite end is attached to a suitable anchor rod —7— on the frame or bed —3—, said anchor rod being adjustable in the bed to vary the tension of the spring as may be desired. It is now obvious that the heart cam —4— actuates the carriage in one direction or to the right of Fig. 2, while the spring —5— actuates it in the other direction, at the same time maintaining contact between the fixed stop —6— and perimeter of the cam. This cam is preferably secured to the under side of a worm gear —8— which in turn is mounted upon a vertical spindle —9— the latter being journaled in a bearing —10— on the carriage —1—.

The worm gear —8— is driven by a worm —11— on a revolving shaft —12—, the latter being provided with a pulley —13— adapted to be rotated by any suitable power not necessary to herein illustrate or describe.

The driving shaft —12— is journaled in opposed bearings —14— and —15— on the sliding carriage —1— and is movable endwise therein against the action of the spring —16— the worm —11— being interposed between the bearings —14— and —15— which hold it against endwise movement and is provided in one end with recesses —18— forming a clutch face adapted to be engaged by one or more shoulders —19— on the shaft —12—.

The spring —16— is interposed between the bearing —14— and a shoulder —20— on the adjacent end of the shaft —12— and tends to force the shaft endwise toward the left of Fig. 3 to normally throw and hold the clutch shoulder —19— into the recess —18— when the machine is in operation but these clutch sections are adapted to be disengaged when the machine is not in use in a manner hereinafter described to permit the continued rotation of the pulley —13— without rotating the worm —11— or parts actuated thereby.

Secured to the driving shaft —12— and preferably at one end of the worm —11— is a pinion —21— meshing with a gear —22— which is rigid on a shaft —23— running lengthwise of the machine parallel with and in a plane above the shaft —12—.

The gear —22— is located at one end of the shaft —23— which is provided on its opposite end with a second gear —24— of the same pitch as the gear —22—. These gears —22— and —24— mesh respectively with similar larger gears —25— and —26—, the gear —25— being secured to a spindle —27— and the gear —26— secured to a similar but separate spindle —28—, said spindles —27— and —28— and also the gears —25— and —26— having co-incident axes.

The spindles —27— and —28— are arranged end to end in exact alinement with each other, the spindle —28— being rotatable in suitable bearings —29— and is fixed from endwise movement, while the spindle 27— is rotatable in suitable bearings —30— and is adjustable axially by means of a nut —31— and a spiral thread —32—, consisting in this instance, of a coil spring encircling the shaft and having one end secured thereto by suitable fastening means, as pins —33—, the opposite end of said spring thread abutting against a revoluble sleeve —34— in the adjacent bearing —30—.

The nut —31— preferably consists of a sleeve encircling the spring thread —32— and portion of the spindle —27— between the bearings —30—, said sleeve having a threaded aperture in which is inserted a screw —36— having its inner end interposed and adapted to ride between adjacent helices of the spring thread —32—, as best seen in Fig. 3, said sleeve also being provided with a knurled hand wheel —37— by which it may be rotated to move the spindle —27— endwise.

The gear —25— is preferably secured to the rotary sleeve —34— which, in turn, is feathered upon the spindle —27— to rotate therewith, but is held from endwise movement by suitable shoulders —40— and a set screw —40', which also serves to hold the gear —25— against axial movement and keys the gear and sleeve —34— to the shaft —27—.

The inner end of the sleeve —34— affords a suitable abutment for the adjacent end of the spring thread —32— so that the spindle —27—, spring thread —32—, and nut —31— all rotate together, although the nut —31— has an independent rotary movement to move the spindle —27— endwise through the medium of the screw shoulder —36— which engages the helices of the spring thread —32—.

The lens as —a— is held between clamping heads —41— and —42— on the meeting ends of the spindles —27— and —28—, each having a yielding contact face —43— of rubber or equivalent material adhesively secured thereto, to more firmly grip and hold lenses of different thicknesses and contours without liability of breaking or otherwise marring the same. This yielding grip of the clamping elements —41— and —42— upon the lens is further aided by means of the spring —32—, the tension of which may be increased at will by simply rotating the sleeve or nut —31— in the same direction of rotation as the lens clamping elements —41— and —42— and their spindles —27— and —28— as will be evident upon reference to the pitch of the helices of the coil spring —32— seen in Fig. 3.

These lenses are usually elliptical or oval shape but of different sizes or axial dimensions and in order that they may be ground to a predetermined form and size, I provide the spindle —28— with a suitable masterform or pattern —46— which is clamped or detachably secured to the outer end of the spindle by suitable clamping screws —47—, pins —48— whereby it is firmly locked to the spindle —28— with its periphery adapted to bear upon or revolve against a contact plate —49— having a contact face —50— arranged in a circular arc concentric with the axis of the grind-stone —A— and of the same or approximately the same radius as the grind-stone.

The shaft —23— is journaled in bearings —17— upon the carriage —1— and the bearings —29— and —30— are mounted upon and form a part of a rocking frame —51— which is pivotally mounted or journaled upon the intermediate portion of the shaft —23— between the bearings —17— to permit the upper portion of the frame, carrying the lens holders and lens pattern, to be rocked toward and from the periphery of the grind-stone and contact plate —49— against the action of a retracting spring —53—.

The masterform or pattern —46— may be of any desired contour according to the shape of the lens which it may be desired to produce and the contact face —50— which is adapted to be engaged by the periphery of the lens form —46— is not only concentric with the axis but adjustable radially of the grind-stone, the size of the lens depending upon the size of the masterform or pattern —46— and also upon the relative position of the contact face —50— with reference to the axis of the grind-stone, that is by varying the radius of the concentric contact face —50— so as to be greater or less than that of the grind-stone, the lens will be ground either smaller or larger than the masterform or pattern, or when such radii are equal the finished lens will be the same size as the pattern.

The contact plate —49— is secured to an arm —60— on a non-rotatable sliding rod —61— which is guided in suitable bearings —62— and —63— on the carriage —1—, the front end of said rod being threaded and engaged by a suitable nut —64— having graduations —65— upon its periphery corresponding to the pitch of the thread and adapted to be brought into registration with a fixed graduation on the bearing —63— so that by a predetermined degree of rotation of the nut —64—, the contact face —50— of the plate —49— will be shifted radially of the grind-stone a predetermined distance, thereby causing the lens to be ground to the predetermined axial dimensions required.

The rod —61— and parts connected thereto are forced endwise in one direction by means of a spring —70— which is interposed between the bearing —63— and a shoulder —71— and operates to hold the nut —64— in frictional engagement with the bearing —63— to prevent undue turning of said nut when it is once adjusted.

When the lens is finished or at any time during the process of grinding, the frame —51— carrying the lens holder and former or pattern may be rocked forwardly against the action of the spring —53— or by disconnecting said spring. At such times it is desirable to disconnect the driving mechanism and pulley —13— and its shaft —12— from the worm —11—, thereby stopping all parts deriving motion from the shaft —12— and allowing free rotation of the driving element, and for this purpose I provide the lower side of the rocking frame —51— with a pendent cam —75— which, when the frame is rocked away from the grindstone the contact plate —49 rides against the adjacent end face of the shoulder —20— thereon and forces the shaft —12— endwise against the action of the spring —16— to disengage the clutch shoulders —19— from the adjacent clutch face of the worm —11— in which position the said shaft is held until the rocking frame 51— is returned to its grinding position.

The nut —64— is preferably made of inner and outer concentric sections relatively adjustable about their axis to compensate for wear of the grindstone, and when adjusted, are locked together by a set-screw —64'—.

Assuming that the lens holders —41— and —42— are separated a sufficient distance apart; the rough or unfinished lens, as —a—, is inserted by hand between the yielding gripping plates —43— on the clamping heads —41— and —42—, reasonable care being taken to have the longer axis of the lens in about the same position as the long axis of the form or pattern —46— and with the center of the lens nearly coincident with the axis of the spindles —27— and —28—, whereupon the nut —31— is rotated by hand in engagement with the spring screw —32— to force the spindle —27— endwise toward the spindle —28— until the lens is firmly impinged between the gripping faces of the clamping heads, it being understood that the lens-form or pattern has been clamped to the end of the spindle —28— and that the contact plate —49— has been properly adjusted by the rotation of the nut —64— to give the desired size and form to the finished lens. The frame —51— is then rocked rearwardly to bring the edge of the lens against the periphery of the grind-stone —A— against which it is yieldingly held by the spring —53—. When the frame —51— is thus thrown into action its cam —75— is disengaged from the shoulder —20— on the adjacent end of the shaft —12— allowing the spring —16— to return the shaft to its normal position thereby throwing the clutch —19— in operative connection with the adjacent end of the worm —11—, from which latter reciprocal motion is transmitted to the carriage —1— by means of the heart cam —4— and pin —6— while the rotary motion is imparted to the spindles —27 and —28— through the medium of the gears —21— and —22—, 24, 25 and 26.

It will be observed that practically all of the bearings for the rotary members are equipped with suitable wearing sleeves of brass or other suitable material adapted to be removed when worn and replaced by new ones. It will also be observed that each spindle —27— and —28— is driven by separate sets of gears, that is the spindle —27— is driven by the gears —22— and —25— while the spindle —28— is driven by the gears —24— and —26— through the medium of the shaft —23—, and in as much as each set of gears are of the same relative pitch, both spindles are rotated positively at exactly the same speed.

What I claim is:

1. In a lens forming machine, the combination with a rotary grinding element, rotary lens clamps and supports therefor movable back and forth across the face of the grindstone, means for effecting such back and forth movement, a yielding thread and a nut engaged therewith for adjusting one of the clamps toward and from the other clamp, a lens form rotating with one of the clamps and a contact plate for the lens form adjustable in a straight line toward and from the axis of the lens form.

2. In a machine for forming lenses, the combination with a rotary grinding element, a rotary lens holder and actuating means therefor, additional means for moving the lens holder across the face of the grinding element, a lens form rotating with the lens holder, a contact piece for the lens form, and means including a non-rotatable sliding rod for adjusting the contact piece in a straight line radially of the lens form and a spring pressing the rod in one direction.

3. In a machine for grinding the edges of lenses, co-axial rotary lens clamps and rotating means therefor, separate means for adjusting one of the lens clamps toward and from the other, a lens form rotating with said lens clamps, a contact piece for the lens form, and means including a nut for adjusting the contact piece in a straight line radial of the lens form, said nut being composed of two concentric parts, one of which is adjustable about its axis relatively to the other, and means for locking said parts together.

4. In a lens grinding machine of the class described, in combination with a rotary grinding element, a rotary lens holder and driving means therefor, a lens form co-axial with the lens holder and revolving therewith, a bearing for the lens form concentric with the axis of the grindstone, and adjustable in a direct line between the axis of said grinding element and lens-form, and means including a sliding rod and spring for adjusting said bearing.

5. In a lens grinding machine of the class described, in combination with a grinding element, a rotary lens holder movable parallel with and toward and from the axis of the grinding element, a lens form co-axial and rotating with the lens holder, a bearing for the lens form, a sliding support for the bearing and having a screw threaded end, and a rotary graduated adjusting nut engaging said threaded end for moving the sliding support endwise in one direction, and a spring for forcing said rod in the opposite direction.

6. In a lens grinding machine of the character described, in combination with a rotary grinding element, a rotary lens holder movable across and toward and from the face of the grinding element, means to rotate the lens holder, a lens form co-axial and rotating with the lens holder, a bearing for the lens form concentric with the axis of the grinding element, a sliding support for the bearing and having a threaded end, a spring for moving the support in one direction, and a rotary adjusting nut engaging said threaded end for moving the support against the action of the spring and provided with graduations to indicate the position of the bearing relatively to the lens form.

7. In a lens grinding machine of the character described in combination with a grinding element, separate co-axial lens clamps, and means for rotating the same, a contact plate co-axial and rotating with the lens clamps, a bearing for the lens form, and means including a spiral spring thread and nut engaged therewith for adjusting one of the clamps axially.

8. In a lens grinding machine of the character described, separate rotary co-axial lens clamps and actuating means therefor, in combination with means including a compressible and extensible spring thread, and a nut co-acting therewith to move one of the lens clamps axially.

9. In a lens grinding machine of the character described, separate co-axial spindles, and means for rotating the same, lens clamps on the meeting ends of the spindles, a coil spring encircling and attached at one end to one of the spindles, a hand rotated element encircling the spring and provided with a shoulder engaging the helices of the spring for adjusting the adjacent spindle axially under a yielding pressure.

10. In a lens grinding machine of the character described, co-axial rotary spindles arranged end to end, one of said spindles being adjustable axially relatively to the other spindle, lens clamps on the meeting ends of the spindles, and means including a spiral spring thread encircling the adjustable spindle, and secured at one end thereto, and a hand rotated element encircling said spring and provided with means engaged therewith and movable along the helices to move the adjustable spindle axially under a yielding pressure.

11. In a lens grinding machine of the character described, separate rotary co-axial spindles arranged end to end, lens clamps on the meeting ends of the spindles, means for driving the spindles at the same rate of speed, a spiral spring attached to and encircling one of the spindles, a sleeve rotatable independently of the spindles and provided with a shoulder riding against and along the helices of the spring whereby the corresponding spindle may be moved axially toward and from the other spindle to clamp the lens under yielding pressure.

12. In a machine of the character described, a rotary lens clamp adjustable axially, means to rotate said clamp, separate means including a spiral spring thread and nut for forcing said clamp endwise.

13. In a lens grinding machine of the character described, a rotary lens holder and rocking support therefor, driving means for the lens holder, and additional means brought into action by the rocking of the support in one direction for breaking the connection between the driving means and lens holder.

14. In a lens grinding machine of the character described, a rotary lens holder and a rocking support therefor, driving means for the lens holder including a clutch adapted to be thrown into and out of action, and means on the support for throwing said clutch out of action when the support is rocked in one direction.

In witness whereof I have hereunto set my hand this 1st day of April 1907.

BENNETT F. CLARK.

Witnesses:
J. W. WHITWELL,
P. B. ROGERS.